United States Patent

[11] 3,616,846

[72] Inventor Frank E. Wills
York, Pa.
[21] Appl. No. 877,318
[22] Filed Nov. 17, 1969
[45] Patented Nov. 2, 1971
[73] Assignee Borg-Warner Corporation
Chicago, Ill.

[54] CONTROL SYSTEM FOR HEATING AND/OR
COOLING SYSTEM
11 Claims, 4 Drawing Figs.
[52] U.S. Cl. .................................................. 165/26,
236/78
[51] Int. Cl. ............................................... F25b 29/00
[50] Field of Search .................................... 165/26, 27;
236/78

[56] References Cited
UNITED STATES PATENTS
3,500,898 3/1970 Gerhart, Jr. et al. ............ 165/26
3,526,271 9/1970 Jednacz et al. ................. 165/26

Primary Examiner—Charles Sukalo
Attorneys—Donald W. Banner, William S. McCurry and John W. Butcher ABSTRACT: A control system for thermal (heating and/or cooling) equipment is disclosed in two embodiments both of which employ a thermistor to derive a temperature voltage signal and at least two Op-Amp comparator circuits driven by that signal and different reference signals to operate thermal equipment switching means. The first embodiment has only a single stage pair of Op-Amp comparators with the positive of one and the negative input of the other connected to the temperature signal to drive on either heat or cool switching means, but not both at the same time. The second embodiment has two stages of Op-Amps, a first delay and amplifying stage for the temperature signal and a second comparator stage made of a plurality of comparators coupled as in the first embodiment for driving either a heat switch or a cool switch.

Inventor
Frank Eugene Wills

By Richard G. Kinney
Attorney

FIG. 3

Inventor
Frank Eugene Wills
By Richard G. Kinney
Attorney

FIG. 4

Inventor
Frank Eugene Wills
By
Richard F. Kining
Attorney

CONTROL SYSTEM FOR HEATING AND/OR COOLING SYSTEM

FIELD OF THE INVENTION

The present invention is directed toward an improved control system for a heating and/or cooling system of the type that may be employed for the temperature control of environments for human occupation such as an apartment, house or office building.

BACKGROUND OF THE INVENTION

The present control system is an improvement over the system taught in the application for U.S. Pat., Ser. No. 755,280 of C. M. Gerhart, Jr., and T. C. Jednacz entitled "-Control System for Multistage Heating and Cooling System," which application was filed on Aug. 26, 1968, and now U.S. Pat. No. 3,500,898 granted Mar. 17, 1970, and is assigned to the assignee of the present invention. As was pointed out in the Gerhart and Jednacz application, stringent requirements are imposed on temperature control systems for regulating the environment of human beings by the physiological and psychological responses of the humans involved and the practical requirements of power sources and equipment. Humans react negatively to wide swings in temperature while the electric utilities especially object to control of cooling or heating equipment that causes sudden shifts in the load placed upon their power lines. The present invention invention provides a system that minimizes these undesirable aspects of a control system in a simple and economic manner. While the aforementioned Gerhart and Jednacz system is entirely adequate and has many of the advantages of the present system, it involved the use of separate logic and delay circuits, the necessity of which is alleviated by the present invention.

BRIEF SUMMARY OF THE INVENTION

The present invention provides an improved electronic control system for controlling the energy transferred to heating and/or cooling equipment as a function of a sensed temperature. The system includes means, such as a Thermister, for generating a temperature representative signal and a source of different reference signals, such as a voltage divider network. Also provided are a plurality of individual comparator units, such as operational amplifiers in Schmitt trigger circuits, coupled to receive the temperature representative signal and different ones of the reference signals and to produce a command signal when the temperature representative signals reach or exceed a predetermined relationship to the particular one reference signal. The output of each of the comparators is coupled to a different switch circuit, such as a Triac, that controls one stage of the associated heating or cooling equipment.

In this manner one or more stages of heating or cooling equipment may be activated to return the controlled environment to a desired temperature and to maintain it within a close range of that temperature.

For convenience herein, we will use the term "thermal" equipment to apply to heating and cooling equipment.

BRIEF DESCRIPTION OF THE DRAWINGS

The features of the present invention which are believed to be novel are set forth with particularity in the appended claims. The invention, together with further advantages thereof, may best be understood by reference to the following description taken in connection with the accompanying drawing, in the several figures of which like reference numerals identify like elements, and in which:

DESCRIPTION OF THE FIRST EMBODIMENT

Figure 1:
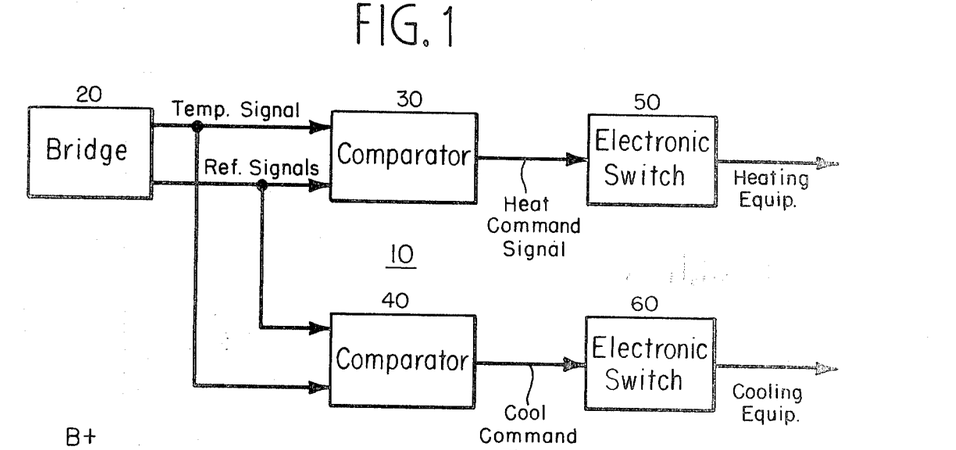
FIG. 1 is a block diagram of a simple heating and cooling system, constructed in accordance with the present invention, of the type governing the operating of two temperature changing units, a heating unit and a cooling unit.

Referring to FIG. 1, the general system is there designated by the numeral 10 and includes a reference signal and temperature-representative representative signal source 20 which is preferably a bridge circuit. A pair of comparator circuits 30 and 40, which are preferably Schmitt voltage level detectors, are coupled to receive the outputs from the bridge signal source 20. The comparators 30 and 40 each function to develop a command signal when the temperature signal reaches or exceeds a certain relationship with the reference signal and control respectively electronic switch units 50 and 60 which control thermal equipment respectively of the heating and of the cooling types.

In overall operation, the bridge 20 develops temperature signals and reference signals which govern the operation of the comparators or detectors 30 and 40 to thereby operate, when needed, the switches 50 and 60 to turn on the heating or the cooling equipment.

Figure 2:
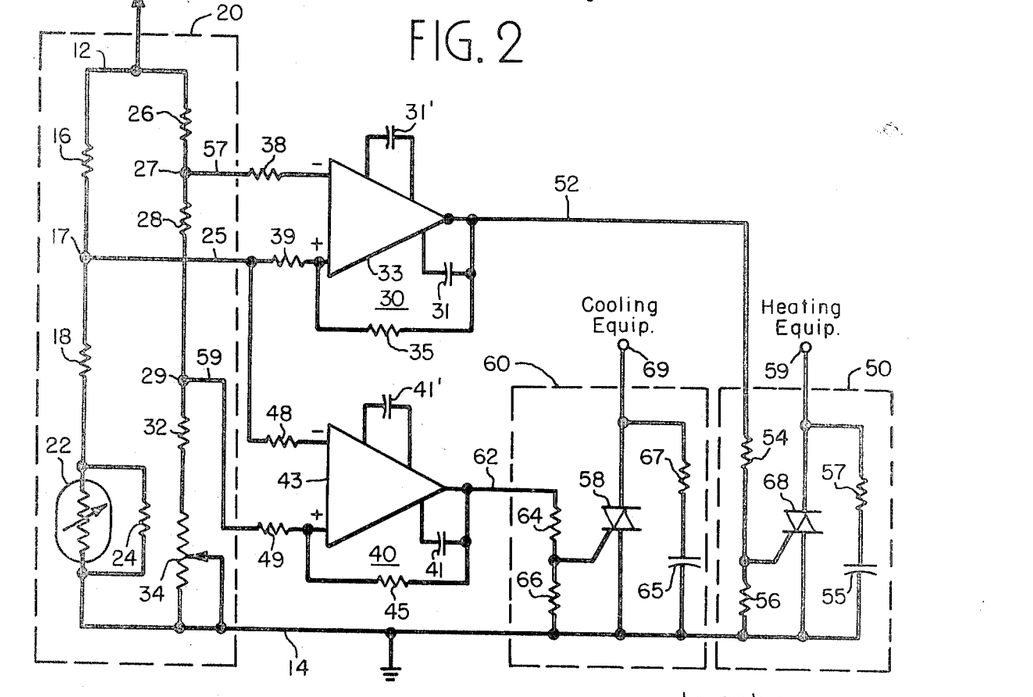
FIG. 2 is a circuit diagram of the system of FIG. 1 depicting in more detail the construction of that system.

Referring to FIG. 2, the circuit for the system 10 will now be explained in greater detail.

The bridge 20 is a wheatstone bridge with a positive voltage placed across it between conductors 12 and 14. The potential of line 14 will be here taken as a plane or reference, common or "ground" potential. Although here termed "ground" it should be noted that it is not necessarily at earth potential.

The bridge 20 includes a first resistor 16 connected between the line 12 and a circuit junction point 17. Also connected to junction 17 is one end of a second resistor 18 whose other end is connected to one side of a parallel connected thermister 22 and linearizing resistor 24. The other ends of the resistor 24 and of the thermister 22 are connected to the reference potential line 14.

The circuit junction point 17 serves as the temperature representative voltage signal source and connected thereto is an output line 25.

A second branch of the bridge circuit 20 includes four additional resistors: a fourth resistor 26 connected between line 12 and a circuit juncture point 27; a fifth resistor 28 connected between the point 27 and another circuit juncture point 29; a sixth resistor 32 connected between the point 29 and one side of a seventh resistor 34. The resistor 34 is a variable resistor used in adjusting or selecting the activating temperature of the control system 10 and has its other end and its movable tap connected to the reference line 14.

The reference signal voltages for the detectors 30 and 40 are respectively taken from the circuit junction points 27 and 29 via a pair of conductors 57 and 59. By varying the tap on the resistor 34, the level of these voltages may be varied to adjust the response of the system and the tap could be calibrated in degrees, e.g. 65°–85° F.

The detector 30 is preferably made from an operational amplifier 33 with the reference voltage signal line 57 connected, through a resistor 38, to its negative primary input and the temperature representative signal line 25 connected, through a resistor 39, to its positive primary input. The output of the operational amplifier 33 is connected to a command signal line 52 and is also fed back via a capacitor 31 to the operational amplifier 33 bottom terminal and also via a feedback resistor 35 to the positive primary input of the operational amplifier 33. The additional terminals of the operational amplifier 33 are connected together by a capacitor 31'.

The comparator 40 similarly includes an operational amplifier 43. However, in this case, the negative primary input of the operational amplifier 43 is connected, through a resistor 48, to the temperature signal line 25 while the positive primary input terminal is connected to the reference signal line 59, through a resistor 49. This is precisely the opposite relationship than that of the operational amplifier 33 where the positive input was coupled to the temperature signal and the negative input was coupled to the reference signal.

The other connections of the operational amplifier 43 are similar to those of the operational amplifier 33. That is, the output of the operational amplifier 43 is connected to a command signal output line 62, through a feedback resistor 45 to its positive input, and through a capacitor 41 to its fourth terminal. The fifth and sixth terminals of the operational amplifier are connected together by a capacitor 41'.

The output lines 52 and 62 are respectively connected to electronic switch circuits 50 and 60. Each of these circuits include a pair of series connected resistors 54, 56 or 64, 66, respectively connected between the line 52 and 62 and ground. The junction of these resistor pairs 54, 56 or 64, 66 are connected to the gate of a Thyrister 58 or 68 of the Triac type, which in turn has its controlled terminals connected between an output terminal 59 or 69 and ground. Further provided are a series connected resistor 57 or 67 and a capacitor 55 or 65, which series connection is connected across the Triac 58 or 68.

The operational amplifiers 33 and 43 are preferably a "dual" operational amplifier such as the MC 1437-L which comprises two operational amplifiers in one small ceramic package. Further, each of the operational amplifiers 33 and 43 here described are connected in a comparator circuit configuration commonly called a Schmitt trigger circuit.

OPERATION OF THE FIRST EMBODIMENT

As mentioned above, in overall operation the circuit of the system 10 functions to control the temperature of an environment by converting the sensed temperature into an electric voltage signal and by using that signal with selected variable reference signals to turn on heating or cooling equipment, by the switches 50 or 60, when the sensed temperature is below or above certain selected values.

The thermister 22 of the bridge 20 changes its resistive value in relationship to the temperature of its environment. A change in environmental temperature changes the resistance of the thermister 22. This changed resistance results in a shift in the voltage level at point 17 in the voltage dividing circuit made up of the resistors 16, 18, 24 and the thermister 22.

This voltage is coupled to the positive input of the operational amplifier 33 and the negative input of the operational amplifier 43. Two reference voltage signals are derived from points 27 and 29 by the voltage divider made up of the resistors 26, 28, 32 and 34. It should be noted that the voltage at point 27 is higher in value than that at point 29. These voltage values are adjustable together by means of the variable resistance 34 which may be calibrated in temperature degrees for use as the temperature selecting media. In one preferred embodiment this resistance was chosen to yield a selectable nominal temperature in the range of 65°–85° F.

It should be noted that both the temperature and the reference signals are derived from voltage dividers across the same input voltage B+ and can be defined in terms of the ratio of the resistances to the voltage B+ (if the small current through the signal lines 25, 27' and 29' are ignored). Thus, the ratios of these voltages to one another are practically independent of variation in voltage supply. This allows a simple and economic voltage supply to be employed for B+. In the depicted circuit, a single diode and a signal capacitor power source has proven adequate.

The Schmitt trigger circuits including the operational amplifier 33, normally has an output voltage signal of approximately ground level but when the voltage on its positive input terminal reaches a value above the reference value the output shifts to a constant voltage level of approximately B+ This shift in output on line 52 operates or turns on the electronic switch 50 including the Triac 58 to cause the heating equipment to be operated. Similarly the Schmitt trigger including the operational amplifier 43 changes its output on line 62 from approximately ground level to B+ when the temperature representative voltage falls on its negative input below the reference voltage on its positive input. This causes the switch 68 to "close" and activate the cooling equipment.

For temperature representative voltages between the two reference voltages a "dead band" exists wherein neither switch 50 or 60 is closed and no equipment is operated.

DESCRIPTION OF THE SECOND EMBODIMENT

Figure 3:
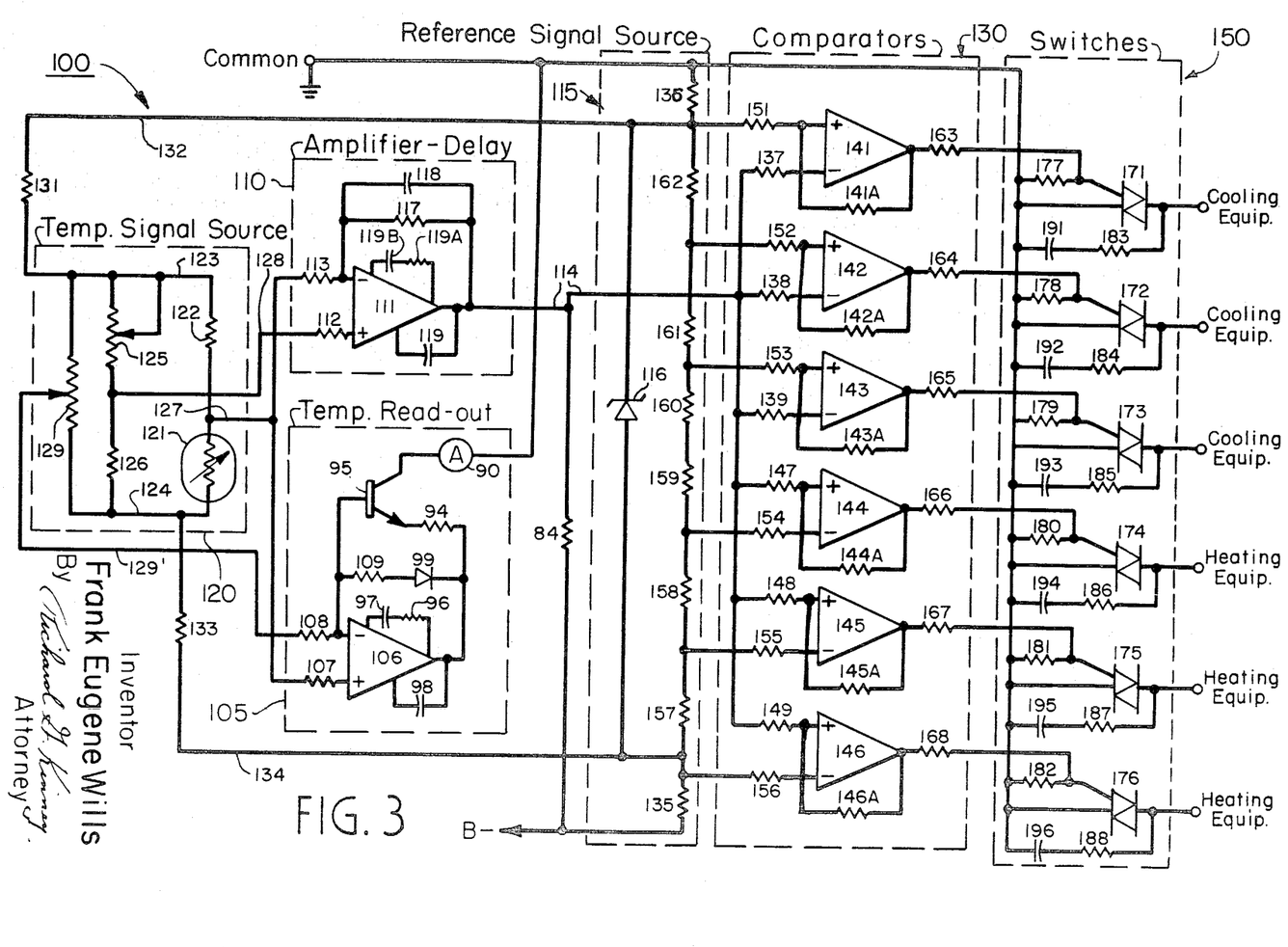
FIG. 3 is a circuit diagram of a three-stage heating and three-stage cooling system, also constructed in accordance with the present invention, of the type that may govern the operating of several heating and/or cooling units.

In FIG. 3 the second embodiment of the present invention is illustrated. This system is generally designated 100 and includes a temperature-representative signal source 120 of the bridge circuit type whose output is fed to DC amplifier 110 from which a temperature-representative output signal is derived and fed via a conductor 114 to a plurality of comparators 130, each one of which operates a different one of a plurality of electronic switches 150. Different valued reference signals for the plurality of comparators 130 are derived from a source 115 of the voltage divider type. The system 100 also includes a sensed temperature readout device 105 which is also connected to the bridge circuit 120.

The general system 100 differs from the previous system 10 primarily in the provision of the amplifier 110, in the use of a separate reference voltage source 115 and in the use of a larger number of comparators 130 and switches 150. The temperature readout unit 105 is an optional circuit that doesn't enter into the functioning of the control system and which could also be employed in the system 10.

The bridge 120 comprises a wheatstone bridge with a thermister 121 functioning to determine its output. The thermister 121 is in series connection with a fixed resistor 122 between a pair of voltage input lines 123 and 124. Also connected between these lines 123 and 124 is the series connection of a variable resistor 125 and a fixed resistor 126. The outputs from the bridge 120 are derived via conductors 127 and 128 connected respectively to the junction of the thermister 121 and the resistor 122 and to the junction of the variable resistor 125 and the resistor 126. Also connected to the lines 124 and 123 of the bridge 120 are the ends of a resistor 129 which also has a movable tap. The movable tap of the resistor 129 is connected over a conductor 129' to the temperature readout circuit 105, whose description and operation will be taken up later.

The line 123 from the bridge 120 is connected, through a resistor 121, to a conductor 132 while the line 124 is similarly connected, through a resistor 133, to a second conductor 134. The conductor 132 is maintained at a predetermined voltage difference more positive than the conductor 134 by means of a voltage regulating Zener diode 116 which has its anode and cathode directly connected respectively to the line 134 and the line 132.

The conductor 132 is connected through a resistor 136 to a plane or source of constant DC potential which is here taken as "ground" or the primary voltage reference plane. It, of course, need not be at true earth potential. Similarly the conductor 134 is connected through another resistor 135 to another plane or source of constant DC voltage which being more negative than that which have been designated as ground, is here designated B−.

The amplifier 110 comprises an operational amplifier 111 whose primary positive and negative inputs are respectively connected through resistors 112 and 113 to the output lines 127 and 128 from the bridge circuit 120. The output of the operational amplifier 111 is connected to the conductor 114. The line 114 is connected to B− through a resistor 84. A feedback circuit between the line 114 and the negative primary input of the operational amplifier 111 is provided which consists of the parallel circuit connection of a resistor 117 and a capacitor 118. The output line 114 is also coupled to the fourth terminal of the operational amplifier 111 by a capacitor 119 and the fifth and sixth terminals of the operational amplifier 111 are interconnected by the series circuit connection of a resistor 119A and a capacitor 119B.

As so connected, the operational amplifier serves to time average the difference between its positive and negative inputs to derive a new temperature-representative representative signal and to amplify that signal. This stage serves to provide a time delay to any sensed change in temperature and to prevent erroneous transient responses in the remainder of the system 100.

The amplified temperature-representative voltage signal is fed from the amplifier 110 to the comparator circuits 130 via the conductor 114. The comparator circuits 130 are shown and will be here described as comprising six different comparator circuits. It should be noted, however, that this number is representative and more or less individual comparator circuits could be employed as desired or dictated by the heating and/or cooling equipment being controlled by the system 100.

The comparator circuits 130 comprise six individual comparator circuits each employing one operational amplifier which are successively designated 141, 142, 143, 144, 145 and 146. Each of these are connected as were the operational amplifiers 33 and 43 of FIG. 2, that is, as Schmitt trigger circuits, with each including a resistor 141A–146A in a feedback path between their respective outputs and positive primary inputs. For convenience and clarity, the representation of the other connections are not depicted in FIG. 3, these being understood to be the same as was previously described.

The operational amplifiers 141, 142 and 143 serve 141, 142, 143, 144, 145 and 146 are connected respectively through resistors cooling equipment and have their primary negative inputs connected, through respective resistors 137, 138 and 139, to the temperature-representative signal line 114. The operational amplifiers 144, 145 and 146 are for the control of heating equipment and have, therefore, their positive inputs connected, through respective resistors 147, 148 and 149, to the temperature-representative signal line 114.

The other primary inputs to the operational amplifiers 141,142,143,144, respectively through resistors 151, 152, 153, 154, 155 and 156 to different reference voltage signal outputs from the voltage signal source 115.

The reference voltage signal source 115 comprises a number of series connected resistors successively designated in FIG. 3 from the line 134 to the line 132 by the numerals 157, 158, 159, 160, 161 and 162, the inputs to the operational amplifiers 141 through 146 being taken respectively from line 132, the junction of resistors 161 and 162, the junction of resistors 158 and 159, the junction of resistors 157 and 158 and line 134. It can thus be seen that the reference voltage signals supplied to the successive operational amplifiers 141–146 are successively more negative in value.

The outputs of the Schmitt triggers formed by the operational amplifiers 141–146 are connected respectively, through resistors 163–168, to different electronic switch circuits of the set of switches 150.

Each of these switch circuits 150 are identical to one another and to the switches 50 or 52 of FIG. 2. That is, they all include a Triac, respectively 171–176, whose gate is connected to the input from the corresponding comparator of the comparators 130 and one of whose controlled terminal is connected to a common potential level, while the other is coupled to the temperature control equipment and ultimately to a source of AC power. Also, each switch includes a resistor, respectively designated 177–182, connected between the gate of the Triac 171–176 and ground and a series-connected resistor, respectively 183–188, and capacitor, respectively 191–196, circuit connected across the controlled terminals of the Triacs 171–176.

The remote temperature indicator 105 includes an operational amplifier 106 whose positive primary input is connected, through a resistor 107, to the temperature-representative voltage line 127 and whose negative input is connected through a resistor 108, to the tap on the resistor 129.

The tapped resistor 129 and the resistor 122 and thermister 121 function as a wheatstone bridge to develop a temperature-representative voltage difference between the primary inputs of the operational amplifier 106.

Connected between the negative primary input of the operational amplifier 106 and its output is a series-connected resistor 109 and a diode 99 circuit so connected as to allow conventional current flow only from the negative primary input to the output of the operational amplifier 106. The operational amplifier 106 further has a capacitor 98 connected from its output to its fourth terminal and a series-connected capacitor 97 and the resistor 96 circuit connected between its fifth and sixth terminals. As so connected, the operational amplifier serves as a DC amplifier for the temperature-representative voltage on line 127 which amplified voltage is developed across the series-connected resistor 109 and diode 99.

A NPN-transistor 95 is further provided in the circuit 105 with its base connected to the negative primary input of the operational amplifier 106 and its emitter connected, through a resistor 94, to the output of that operational amplifier. Thus, the base-emitter circuit of the transistor 95 is connected across the resistor 109 and diode 99 circuit, to further amplify the temperature-representative voltage signal there developed. The collector of the transistor 95 is connected to one side of an ammeter 90 whose other side is grounded. Thus, if the meter dial is marked in degrees and calibrated to the temperature signal by adjusting the setting of the tap on the resistor 129, the temperature of the environment of the thermister 121 can be read directly thereon. The unit 105 may be located at a remote distance from the controlled temperature environment.

OPERATION OF THE SECOND EMBODIMENT

In overall operation the system 100 functions to operate one or more cooling or heating equipment stages in response to a sensed overtemperature or undertemperature of a sufficient magnitudes over or under a selected or set temperature.

More particularly, the resistance exhibited by the thermister 121 varies in accordance with the temperature. It is placed in the environment whose temperature it is sought to control so that its resistance value is representative of that temperature. The resistance of the thermister determines, with the voltage applied on lines 124 and 123, the voltage at line 127. Similarly the voltage on line 128 is a function of the voltage between lines 124 and 123 and the value of the resistors 126 and the selected value of the variable resistor 125. For any one setting of the variable resistance 125 the voltage on line 128 is fixed in relationship to the voltage across the lines 124–123.

The amplifier 110 receives the voltages from the lines 127 and 128 and functions to amplify delay and time integrate the variation in voltage difference. This stage serves to eliminate erroneous activations of the heating or cooling system equipment in response to short transient "noise" signals or the like. It also introduces additional time delay or "hystereous" in the system that may be varied by the designer of the particular circuit to achieve a better overall response. The damping effect of this unit materially increases the overall performance of the system 100.

The amplified voltage signal on line 114 thus is a signal that is representative of the sensed temperature. More particularly, the level of the DC voltage on line 114 is proportional to the temperature sensed by the thermister 121.

This temperature-representative voltage signal is fed to the negative inputs of the comparator circuits including the operational amplifiers 141, 142 and 143. Fed to the positive inputs of these three Schmitt trigger forming operational amplifiers are progressively larger valued negative reference voltage signals from the source 115. The temperature-representative voltage on line 114, at balance for the system 100 is at a level more negative than any of these three reference voltages.

Now, let us assume that the environment to be thermally controlled increases in temperature. The increase in temperature causes the resistance exhibited by the thermister 121 to decrease in value. This, in turn, causes the voltage level at line 127 to decrease, that is, become more negative. This lower voltage is communicated to the amplifier averager 110 where, because the voltage on line 128 has not changed with temperature, it eventually results in an increasing, more positive from the previous level, voltage on the output line 114.

The operational amplifier 111, as connected, functions to amplify the change in voltage by a large factor (e.g. 200 times) and to invert its direction. It also can be designed to produce a time lag in the change of a period that can be selected by the designer. The value of the capacitor 118 is the primary determinate of the lag time. A typical response delay would be of the order of several seconds and, for example, may be 10 seconds in this particular case.

Thus, after a delay of 10 seconds the voltage level on line 114 has risen, becomes less negative and more positive. This is sufficient to raise the voltage input to the comparator made up by the operational amplifier 143 to trip or change output activating its associated switch circuit including the Triac 173. This closes the circuit for the operation of the one stage of cooling equipment controlled by the Triac 173.

It might be further noted at this point that one advantage of this system is that the delay in response produced by the unit 110 is not a fixed delay but is proportional to the severity of the sensed temperature change. That is, its output rises or lowers at a faster pace in response to large deviations than it does to small deviations.

Should the shift in temperature have been mild, this activation of Triac 173 alone would correct it and bring it back into the desired range. When this latter event occurs, the temperature-representative voltage on line 114 drops below that of the reference voltage coupled to the operational amplifier 143, causing its output, in turn, to go back to its previous level. This results in the thyristor 173 being turned "off" and the deactivating of the first stage of the cooling equipment controlled thereby. However, if the initial shift of temperature were large and persistent, the voltage level on line 114 would continue to rise causing successively the triggering of the Schmitt comparators made up from the operational amplifiers 143, 142 and 141. These, in turn, would successively activate the switches made up by the thyristors 173, 172 and 171 to bring more stages of equipment into operation.

It should be noted that the increase in the temperature-representative voltage causes the controlled cooling units to be activated sequentially and not immediately. Thus, their loads are not placed upon the power lines at the same time, but are placed thereon over a period of time in accord with the desires of the electric utility companies. Similarly, as the temperature rises and the voltage level on line 114 falls, the heating units are deenergized sequentially thus preventing a sudden drop in the power taken from the utility lines and, more importantly, restoring the desired temperature gradually with less chance of "overshoot" or excessive cooling. That is, as the temperature falls past a first level below the desired level, the cooling equipment controlled by the thyristor 171 is deenergized leaving only two units in operation. As the temperature falls further, the cooling equipment associated with the switch of thyristor 172 is deenergized leaving one unit in operation. Finally, when the desired temperature range is reached, the last cooling unit is deactivated. Thus, the cooling units and the desired temperature are approximately expediently approached to prevent overshooting the desired range (and perhaps unnecessarily activating the heating equipment) or causing a psychologically and physiologically undesirable rapid shifts in temperature.

At the desired temperature, or balance, the voltage in line 114 would be approximately equal to one half of the value of B−. This would correspond approximately to the voltage level at the junction of the resistors 159 and 160 of the reference source 115.

As stated before, the reference voltages to the three heating control Schmitt triggers made up by the operational amplifiers 144, 145 and 146 are increasing more negative in value. These reference voltage signals are coupled to negative input terminals of the operational amplifiers while the voltage on line 114 is connected to positive inputs. Thus, these units are not triggered by the normal or balanced voltage level of line 114.

In similar manner a fall in sensed temperature below the balanced level results in the voltage on line 114 going still more negative.

As the voltage on line 114 becomes more negative below the quiescent point of the junction of resistors 159 and 160, it reaches the level of reference input of the operational amplifier 144. When this occurs, the signal to the thyristor 174 is changed causing it to operate turning on the controlled heating equipment. If the sensed temperature rise is large and persistent, the other heating switch units including the thyristors 175 and 176 would be successively turned on. Their behavior would be the same as that of the cooling comparators and switches.

In short, for any temperature voltage on line 114 more negative than the reference value fed through the resistor 153, the comparators made up by the operational amplifiers 141, 142 and 143 and their switches including thyristors 171, 172 and 173 are turned off, and for voltage on line 114 less negative than the voltage coupled through resistor 154, the comparators made up by the operational amplifier 144, 145 and 146 and their associated switches including thyristor 174, 175 and 176 are turned off. Between these two voltages is the quiescent zone or dead band wherein neither heating nor cooling equipment units are operated.

Figure 4:
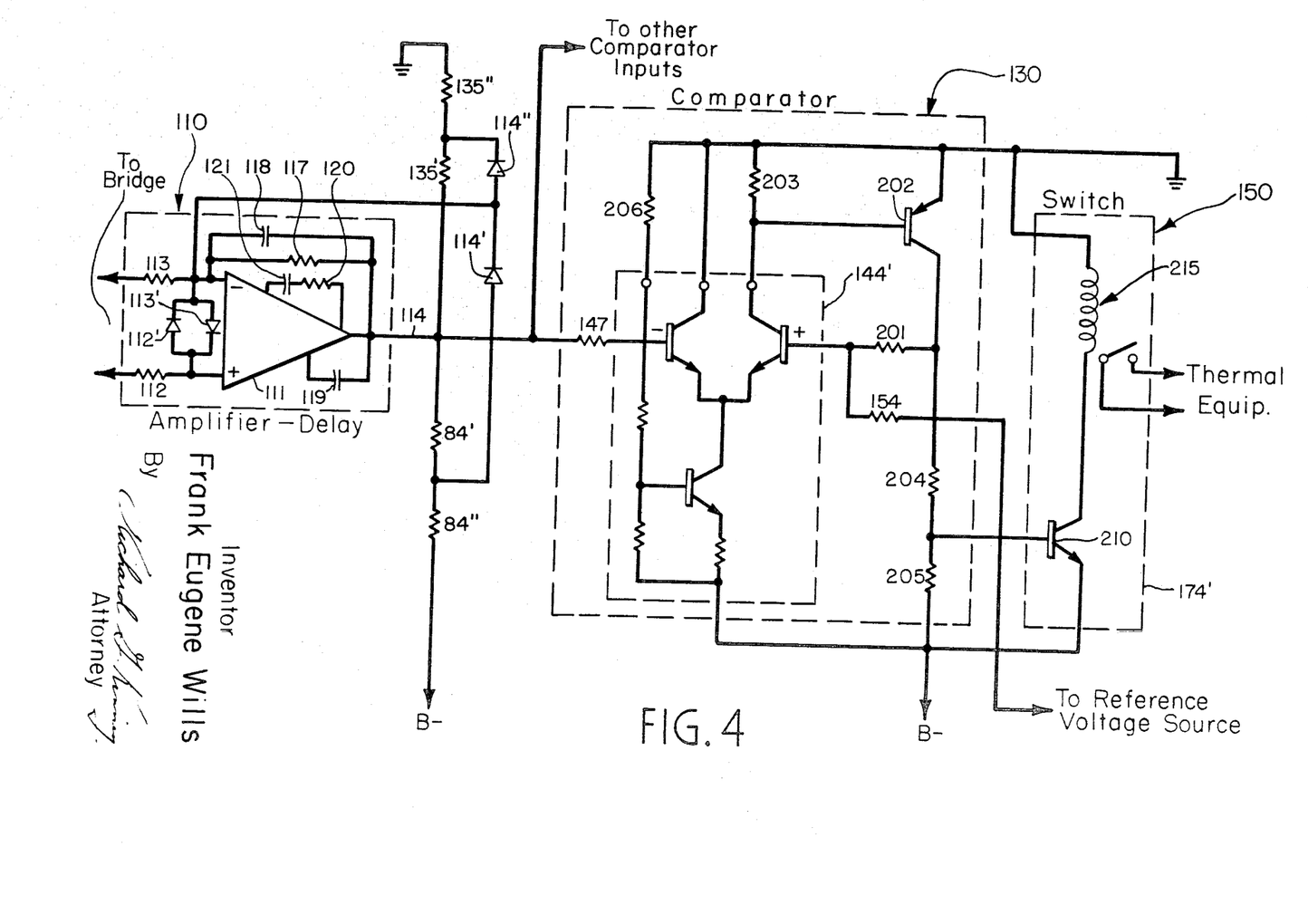
FIG. 4 is a circuit diagram of a variation for a portion of the circuit of FIG. 3 illustrating an alternative preferred construction.

Referring to FIG. 4, there is depicted an alternative construction for the amplifier-delay unit 110 and for the comparators 130. Only the particular comparator equipment to the one including the operational amplifier 144, is illustrated, it being understood that each of the comparator circuits 130 could be constructed in the same manner.

The amplifier unit 110 differs only in the provision of a pair of protection diodes 112' and 113' between the primary inputs of the operational amplifier 111 and by the provision of a second pair of diodes 114' and 114" associated with its output circuit.

More particularly, it should be noted that the diodes 112' and 113', which are preferably 1N 914 diodes, are connected directly across the primary input terminals of the operational amplifier 111 so that the anode of one and the cathode of the other are connected to each of those inputs. As so connected, the diodes secure to protect the inputs from having too large of a voltage difference imposed between them. As such, they secure to protect the operational amplifier from excessive currents and possible breakdown but do not otherwise interfere in the operation of the circuit as above described.

Similarly, the diodes 114' and 114" limit the voltage swings permissible on line 114 and thus secure to protect the second stage of operational amplifiers.

As can be seen in FIG. 4, the resistance 84 of the last embodiment is here made up of two series-connected resistors 84' and 84" whose junction is connected to the anode of the diode 114'. The cathode of the diode 114' is connected to the negative input of the operational amplifier 111 and also to the anode of the diode 114". The cathode of the diode 114", which like 114', 111' and 112' is preferably a 1N 914, is connected to the junction of a pair of series-connected resistors 135' and 135" which replace the resistor 135 of the previous embodiment. This circuit prevents the line 114 from becoming an excessive voltage swing. The diodes 114', 114" as well as the diodes 112' and 113' provide for a small voltage swing.

The particular comparator circuits 130 are here made up of an integrated circuit 144' whose equipment circuit is depicted in FIG. 4 and is preferably a CA 3053. This circuit functions, together with its associated components, as an operational amplifier and can be so regarded. The operation amplifier including the integrated circuit 144' forms a Schmitt trigger circuit.

More particularly, the unit 144' has its primary input terminals connected through respective resistors 147 and 154 to the line 114 and a source of reference signal voltage. The positive input terminal is also connected via a resistor 201 to the collector of a PNP-transistor 202 whose emitter is connected to B+ and whose base is connected to the No. 6 input of the unit 144' and through a resistor 203 to B+. The collector of transistor 202 is connected through the series-connected resistors 204 and 205 to a plane of potential B−. The unit 144 also has its input No. 7 connected through a resistor 206 to B+ and, its input No. 8 connected directly to B+ and its input No. 3 connected to B−.

The junction of the resistor 204 and 205 is connected to the base of an NPN-transistor 210 whose emitter-collector current path is connected to the control coil of a relay switch 215 to secure the same function as the thyristor 174 of the FIG. 3 embodiment.

In operation, the modification of FIG. 4 is identical with the embodiment of FIG. 3 in that the unit 110 serves to amplify and delay the sensed temperature signal to yield on line 114 a temperature-representative signal. When this signal reaches a predetermined relationship with the reference voltage level, fed through the resistor 154, the transistor 202 is turned "on" or rendered conductive to, in turn, turn "on" the transistor 210 and operate the relay switch 215.

As should now be fully apparent a new and improved control system for a heating and/or cooling system has been disclosed. It should be noted that the present invention has the advantage of being adaptable to varying types of multistage or unit temperature control equipment. For example, by changing the interconnection of the reference signal voltage and temperature signal voltage on the three cooling comparators 130 in the FIG. 3 embodiment, a six-stage heating only unit could be controlled. Indeed by simple changes in interconnection, the unit of FIG. 3 could be extended to virtually any given combination of heating and/or cooling equipment units. Similarly, the system of FIG. 1 could be used for control of two-stage heating or two-stage cooling equipment by simple reconnections. It, thus, is clear that the present invention provides a system of control that is versatile and adaptable to many heating and/or cooling systems.

Another advantage of the above described systems is that the cycling rate of the heating or cooling devices may be controlled by providing "hysteresis" in the system. For example, let us assume that a decrease in room temperature has occurred and that the electronic sensor has depicted this change and tripped the circuit which activates the heating device. If no "hysteresis" exists, the heating device will raise the temperature of the room in a few minutes, and the electronic sensor, detecting this change will turn off the circuit which had activated a heating device. The entire cycle time, from "on" to "off" may have taken only 2 minutes. Should the system cycle at this rate, it would mean 30 system cycles per hour and although this would hold the temperature within very close tolerance, it would prove very demanding on the contactors, starters, and so forth. To overcome this the present system sets the "turn on" point and "turn off" point separated by, for example, 1° F. (hysteresis). This means that the temperature would vary ½° F. about the control point, but the number of cycles per hour would be greatly reduced.

It should also be noted that the provision of the amplifier unit 110 in the second embodiment provides a time delay of several seconds. Therefore, the time lag between the initiation of sequential heating or cooling stages may be predetermined by the designer. Besides assuring slow response to erroneous signals, the above described unit also virtually eliminates noise and voltage spikes which could be introduced into the cable connecting the temperature sensor to the temperature signal producing unit. Furthermore, it should be noted that in the case of momentary power failure, it will effect a removal of the heating or cooling equipment for the power lines load and a sequential reintroduction of those units that are needed over a short period of time. This prevents the placement of the total load back on the power lines immediately after power failure and thus, prevents excessive loading on the lines.

In addition, the time delay or lag increases as the system approaches balance. This means that if a large under or over temperature is sensed, the system corrects swiftly but as it nears balance, the system reacts more slowly to approach balance at a slow rate and to prevent overshooting and "hunting."

The system provides specific improvement over that of the aforementioned Gerhart and Jednacz application in that it eliminates the need of certain logic and delay components and provides an improved response to sensed temperature variations.

One of the advantages of the above described systems are their relative independence from normal variations in the voltage supply. This means that a precisely regulated voltage supply need not be employed and a less expensive source may be used. Indeed, a simple power supply source including one diode and one capacitor can be employed to form the bias from a suitable AC voltage line, such as a 25 volt AC line.

It should also be apparent that the present system is simple and economic to manufacture, install and use.

Various of the features of the invention have been particularly shown and described, however, it should be obvious to one skilled in the art that various modifications may be made therein without departing from the scope of the invention.

What is claimed is:

1. A control system for the control of thermal equipment as a function of the temperature of an environment comprising:
   means for sensing the temperature of the environment and for producing a voltage signal representative thereof, and for producing a first and a second reference voltage signals;
   a first comparator actively coupled to said temperature sensing and signal producing means, for comparing the temperature-representative signal and first reference signal, and for producing a first command signal whenever the temperature-representative signal reaches a predetermined relationship with the first reference signal;
   a second comparator, actively coupled to said temperature sensing and reference signal producing means, for comparing the temperature-representative signal and the second representative signal, and for producing a second command signal when the temperature-representative signal and reaches a predetermined relationship with the second reference signal;
   first means for switching thermal equipment coupled to said first comparator for activation by the first command signal; and
   second means for switching thermal equipment coupled to said second comparator for activation by the second command signal.

2. The control system for the control of thermal equipment as a function of the temperature of an environment as defined in claim 1 wherein:
   said temperature sensing and signal-producing means generate a temperature-representative voltage signal in the form of a DC voltage whose amplitude varies in relationship with the temperature and produces first and second reference voltage signals that are DC voltage level signals of different, approximately constant voltage levels;
   said first and said second comparator are each Schmitt trigger circuits which function to produce an approximate constant amplitude voltage output command signal; and
   said first and said second switch means each include a switching device responsive to the presence and absence of the command signal from the respective said first and second comparators.

3. The control system for the control of thermal equipment as a function of the temperature of an environment as defined in claim 2 wherein:

said temperature sensing and signal producing means includes a thermister in series circuit connection with a resistance and a source of direct current potential;

said first and said second comparator Schmitt trigger circuits are each formed by the use of an operational amplifier; and said first and said second switch means each include a thyrister.

4. The control system for the control of thermal equipment as a function of the temperature of an environment as defined in claim 2 wherein:

said temperature sensing and signal-developing means is a bridge circuit having two parallel branches connected across a source of DC fixed potential in which a thermister and resistor are connected in series in one branch from which one branch the temperature-representative signal is derived, and a fixed resistance is in the other branch from which fixed resistance, at two resistively separated points, the first and second reference signals are taken; and said first and said second switch means are respectively for activating heating and cooling equipment.

5. The control system for the control of thermal equipment as a function of the temperature of an environment as defined in claim 4 wherein:

said first and said second comparator Schmitt trigger circuits are each formed by the use of an operational amplifier;

said first and said second switch means each include a thyrister; and the temperature-representative voltage signal is coupled to the positive primary input of one of said first or second comparator operational amplifiers and to the negative primary input of said other one of said first or second comparator operational amplifiers.

6. The control system for the control of thermal equipment as a function of the temperature of an environment as defined in claim 1 wherein:

said temperature sensing and representative and signals producing means comprises a first means for sensing the temperature and for generating a voltage signal representative thereof, and a second means for producing not only the first and second reference voltage signals but at least a third reference voltage signal;

at least a third comparator is actively coupled to said first means and to said second means for comparing the temperature-representative signal and said third reference voltage signal and for producing a third command signal whenever the temperature-representative signal reaches a predetermined relationship with the third reference signal; and third means for switching thermal equipment is coupled to said first comparator for activation by the third command signal, whereby a change in sensed temperature at a large rate may cause activation of more than one unit of thermal equipment to counteract that large rate of temperature change.

7. The control system for the control of thermal equipment as a function of the temperature of an environment as defined in claim 6, wherein:

each of said first, second and third comparators are made up of operational amplifiers in Schmitt trigger circuit which function to produce an approximately constant amplitude DC voltage output command signal;

said temperature sensing and temperature-representative signal producing first means comprises a thermister bridge circuit for generating a first DC voltage representative of the temperature and an integrating-DC amplifier which sums, averages and delays and amplifies the first DC temperature voltage to produce the temperature-representative voltage signal; and said first, second and third switch means each include a switching device responsive to the presence and absence of the command signal from their respective Schmitt trigger comparators.

8. The control system for the control of thermal equipment as a function of the temperature of an environment as defined in claim 4 wherein said system further includes:

a temperature indicator that may be located remotely from said thermister, to give an actual indication of the sensed temperature comprising:

a third branch including a tapped resistor connected in parallel to said branch comprising said thermister and resistor whereby adjustable fixed voltage may be taken from the tap of said tapped resistor;

an operational amplifier having one of its primary inputs coupled respectively to one and the other of the taps of said tapped resistor and to the temperature-representative signal from said thermister and branch;

a transistor having two of its three switches connected between the output and one of the inputs of said operational amplifier, and an ammeter connected in the controlled circuit of said transistor and calibrated for direct reading of temperature;

whereby the sensed temperature may be read directly on the ammeter.

9. The control system for the control of thermal equipment as a function of the temperature of an environment as defined in claim 7 wherein:

said operational amplifiers of said comparators are made up of a solid-state integrated circuit of the CA 3053 type; and said switch means coupled to said operational amplifier of at least one of said comparators is of the relay type.

10. The improvement in a control circuit for multistage thermal equipment (control circuit), of the type employing a first circuit for producing a temperature-representative signal and having a plurality of controlled electric switches, one each for operation of a different stage of the multistage thermal equipment, comprising:

an operational amplifier coupled to the first circuit and to the plurality of controlled electric switches;

said operational amplifier being connected as both a temperature signal amplifier and averager to provide not only amplification of the temperature-representative signal but also significant time delay in the reaching a new status by that signal;

to thereby prevent false actuation by noise signals and too rapid cycling.

11. The control system as defined in claim 1 for the control of thermal equipment of both the heating type and of the cooling type, wherein:

said first means for switching thermal equipment switches heating type equipment;

said second means for switching thermal equipment switches cooling type equipment;

said first comparator and said second comparator each having a positive primary input and a negative primary input; and the positive primary input of one of said first and second comparators and the negative primary input of the other of said first and second comparators are coupled to said temperature sensing and signal producing means for receiving the temperature signal, while the negative primary input of said one and the positive primary input of said other of said first and second comparators are coupled to receive, respectively, said first and second reference voltage signals.

UNITED STATES PATENT OFFICE
CERTIFICATE OF CORRECTION

Patent No. 3,616,846      Dated November 2, 1971

Inventor(s) Frank E. Wills

It is certified that error appears in the above-identified patent and that said Letters Patent are hereby corrected as shown below:

Column 1, line 29, after "present invention" cancel "invention". Column 2, line 13, after "perature-representative" cancel "representative". Column 5, line 7, after "temperature-representative", cancel "representative"; line 30, after "serve", cancel "141" and add -- to control --; line 31, cancel the entire line; line 32, cancel "through resistors"; line 40, after "144," add -- 145 and 146 are connected, --. Column 12, line 37, cancel "(control circuit)".

Signed and sealed this 10th day of October 1972.

(SEAL)
Attest:

EDWARD M. FLETCHER, JR.       ROBERT GOTTSCHALK
Attesting Officer             Commissioner of Patents